(12) United States Patent
Sullivan (10) Patent No.: US 10,620,626 B2
(45) Date of Patent: Apr. 14, 2020

(54) CONFLICT RESOLUTION VIA CONTINGENCY PLAN EXECUTION OR HUMAN INTERACTION

(71) Applicant: Nova Dynamics, LLC, Philomath, OR (US)

(72) Inventor: Joseph Sullivan, Philomath, OR (US)

(73) Assignee: Nova Dynamics, LLC, Philomath, OR (US)

( * ) Notice: Subject to any disclaimer, the term of this patent is extended or adjusted under 35 U.S.C. 154(b) by 12 days.

(21) Appl. No.: 15/361,044

(22) Filed: Nov. 24, 2016

(65) Prior Publication Data

US 2018/0299888 A1 Oct. 18, 2018
US 2019/0171203 A9 Jun. 6, 2019

Related U.S. Application Data (60) Provisional application No. 62/259,152, filed on Nov. 24, 2015.

(51) Int. Cl.
*G05D 1/00* (2006.01)
*B60W 50/029* (2012.01)
*B60W 50/00* (2006.01)

(52) U.S. Cl.
CPC ......... *G05D 1/0061* (2013.01); *B60W 50/029* (2013.01); *G05D 1/0011* (2013.01); *G05D 1/0055* (2013.01); *G05D 1/0088* (2013.01); *B60W 2050/0089* (2013.01); *G05D 2201/0213* (2013.01)

(58) Field of Classification Search
CPC .......................................... G05B 2219/39212
See application file for complete search history.

(56) References Cited

U.S. PATENT DOCUMENTS

| 5,058,024 | A | 10/1991 | Inselberg |
| 5,559,511 | A | 9/1996 | Ito et al. |
| 5,787,262 | A | 7/1998 | Shakib |
| 5,806,074 | A | 9/1998 | Souder et al. |
| 5,884,075 | A | 3/1999 | Hester et al. |
| 5,889,953 | A | 3/1999 | Thebaut et al. |
| 6,205,397 | B1 | 3/2001 | Eslambolchi |
| 6,490,522 | B2 | 12/2002 | Sugiyama |
| 7,076,409 | B2 | 7/2006 | Agrawala |
| 7,430,261 | B2 | 9/2008 | Forest et al. |

(Continued)

OTHER PUBLICATIONS

U.S. Appl. No. 09/668,484, filed Dec. 3, 2002, Dror Lapidot Jonathan Silverberg.

*Primary Examiner* — Daniel Swerdlow
(74) *Attorney, Agent, or Firm* — Dascenzo Intellectual Property Law, P.C.

(57) ABSTRACT

A method for human-arbitrated conflict resolution within autonomous vehicle control system is provided herein. Autonomous operation and capabilities of an unmanned vehicle, such as an urban delivery vehicle, are improved by incorporating an onboard programmable decision unit that operates in an essentially autonomous fashion under normal operating conditions. When dynamic, changing, or unexpected conditions are encountered within the vehicle's environment, an on-board decision making unit decides how to best overcome any problems should they arise. A human operator may interact with the vehicle to resolve a conflict if an intervention delta is exceeded.

20 Claims, 5 Drawing Sheets

(56) References Cited

U.S. PATENT DOCUMENTS

| | | |
|---|---|---|
| 7,565,419 B1 | 7/2009 | Kwiatkowski |
| 8,718,861 B1 * | 5/2014 | Montemerlo ......... B60W 30/00 701/26 |
| 2003/0220966 A1 | 11/2003 | Hepper et al. |

* cited by examiner

CONFLICT RESOLUTION VIA CONTINGENCY PLAN EXECUTION OR HUMAN INTERACTION

CROSS REFERENCES TO RELATED APPLICATIONS

This application claims priority to U.S. Provisional Patent Application Ser. No. 62/259,152 filed on Nov. 24, 2015 entitled "Product Delivery System and Apparatus", the disclosure of which is hereby incorporated by reference.

BACKGROUND OF THE INVENTION

The present invention relates generally to resolving conflicts and, more specifically, to resolving a conflict by executing a contingency plan or requesting human intervention.

BACKGROUND ART

The rationale for the ever-increasing need for autonomous capability of unmanned vehicles stems from the need to provide efficient means to operate vehicles and to accomplish tasks in remote locations, for long, or even very long duration, with limited access to a human operator. It is desirable to reduce the involvement of human operators as they tend to be the most expensive and slowest means for conflict resolution. Furthermore, to operate a vehicle from a remote location in a semi-autonomous man-in-the-loop mode, i.e. a mode of operation involving human intervention, a bi-directional data link between the remote human controller and the on-site unmanned vehicle must be established. Moreover, achieving a high-fidelity video transmission over the data link for long distances, especially if the data link must be secure, involves high cost and cumbersome logistic efforts which may render the use of such a system commercially or operationally prohibitive.

High autonomy unmanned vehicle operation is a key goal when a plurality of unmanned vehicles are operating in a given area. Manual command and control of a fleet of unmanned vehicles by a human operator is extremely complex and expensive if not altogether impossible.

It is accordingly the object of the present invention to substantially reduce or overcome the drawbacks associated with hitherto known semi-autonomous systems.

More specifically, the present invention seeks to enhance the autonomous capability of an unmanned vehicle, such as an urban delivery vehicle, by incorporating an onboard programmable decision unit that operates in an essentially autonomous fashion enabling the vehicle to achieve better performance in accomplishing its tasks under dynamic, changing conditions in an environment while at the same time increasing the likelihood of success. "Autonomous" in the context of the present invention means execution of a task under self-control without any intervention of an external supervisor, operator or human controller, while operating in a dynamic, unpredictable environment.

It is another object of the invention to incorporate a decision unit capable of executing a contingency plan if operating parameters are exceeded, while only contacting a human operator in the most extreme of unforeseen conditions.

It should be noted that other methods of the prior art relating to conflict resolution only attempt to prevent conflicts. One such method involves arbitration of conflicts between servers. For example, when two servers realize that their objects are in conflict, they can initiate a two-way communication dialog to arbitrate any conflicts between them. The arbitration process necessarily includes the exchange of multiple communication messages to resolve the conflict in a manner satisfactory to both servers. Such a process generates additional burdens that the communication links between servers must handle. Thus, such a process requires relatively high bandwidth communication links. Furthermore, because the communication dialog is two-way, the physical communication links between the servers must be able to transfer two-way communication messages with a relatively short elapsed time between sending a message and receiving a reply. This places additional burdens on the servers to respond in a timely fashion and may require dedication of more CPU power to the conflict resolution process.

Another problem with the arbitrated conflict resolution method is that if conflicts are multi-way (three or more servers possess objects in conflict), the difficulty of resolving the conflict, the communication bandwidth, CPU power, and the time needed to resolve the conflict increase at an alarming rate. Furthermore, protocols must be established to allow multi-way conflict resolution in an orderly fashion. When resolving multi-way conflicts, the order of resolution may be important, and negotiation of the order of resolution can add additional overhead to an already complex process. It can be readily seen that as the number of systems in conflict increases, the resources needed to resolve the conflict become prohibitively high for arbitrated conflict resolution.

Other approaches to conflict resolution focused on simply preventing conflicts in the first place. For example, many computer networks are currently configured in a client/server topology. In the client/server model a single copy of the data object resides on the server machine. Client machines are only allowed to access data objects stored on server in a manner that avoids conflicts. Methods such as file locking so that a data object can only be changed by one client at a time, object check-out/check-in procedures and other such techniques are used to avoid conflicts. Similar methods are also employed for other types of networks not configured in a client/server topology.

To solve some of the problems with the above arbitrated conflict resolution method it may be possible, in some instances, to send all conflicts to a central system where the conflicts would be resolved. This method, however, also creates problems. First, the method increases the communication traffic on the network since all systems in conflict must send their data objects to the central location, and, after the conflict is resolved, receive the results of the conflict resolution process. Another problem with such an approach is that if conflicts occur frequently, because all processing is performed by a central location, one system may have to be totally or substantially dedicated to performing conflict resolution. This can increase the cost of the network. Finally, because objects must be sent to a central location for processing and conflict resolution, tasks being performed by clients, such as autonomous vehicles, may have to cease until the conflict is resolved. If conflicts are a common occurrence, such a situation may become untenable.

What is needed to overcome the problems in the prior art is systems and methods for conflict resolution that can resolve conflicts without substantially increasing the communication traffic on the network. It would also be desirable to have systems and methods for conflict resolution that can resolve conflicts without the need to send all conflicts to a central location for resolution. Finally, in order to effectively resolve conflicts, systems and methods should only pass data to a human controller when situations arise that exceed a high threshold for normal operating conditions.

BRIEF SUMMARY OF THE INVENTION

The present invention provides a method for human-arbitrated conflict resolution within autonomous vehicle control systems. Autonomous operation and capabilities of an unmanned vehicle, such as an urban delivery vehicle, are improved by incorporating an onboard programmable decision unit that operates in an essentially autonomous fashion under normal operating conditions. When dynamic, changing, or unexpected conditions are encountered within the vehicle's environment, an on-board decision making unit decides how to best overcome any problems should they arise.

In an embodiment of the present invention, an unmanned delivery vehicle possesses a sensor array containing a plurality of sensors that monitor the vehicle's environment. If data gathered from any of the sensors exceeds an operating threshold, the on-board decision making unit decides whether to continue. If the unit decides that it is safe to continue along the vehicle's pre-programmed route, then the vehicle continues.

In another embodiment of the present invention, If the decision-making unit decides that the it is not safe to continue along the vehicle's pre-programmed route when an unexpected condition arises, then a decision is made whether to execute a contingency plan contained within memory components located within the vehicle. If it is decided that the contingency plan is a safe solution to the encountered conditions, then the vehicle executes the contingency plan.

In still another embodiment of the present invention, If the decision-making unit decides that the it is not safe to execute the contingency plan, then a human operator may be contacted to resolve the problem. Data regarding the unexpected condition is transferred to the operator so that he or she may evaluate the situation and take appropriate action. The type of action that the human operator may take depends on the conditions encountered by the delivery vehicle.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the combination of all its structures for the functions specified.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a method for conflict resolution via contingency plan execution or human Interaction. For the purpose of clarity, all like elements mentioned in this description will have the same designations. The terms "method for conflict resolution via contingency plan execution or human interaction", "conflict resolution via contingency plan execution or human interaction", "conflict resolution method", "method", "invention", and "present invention" may be used interchangeably. The terms "autonomous delivery vehicle", "delivery vehicle", "vehicle", and "robot" may also be used interchangeably. The term "sensor data" can refer to data gathered from a sensor, the results of an algorithm performed on the data gathered from a sensor, or the results of sensor synthesis. The term "operator" and "controller" can be used interchangeably. In addition to the functions, features, components, and abilities of the invention already discussed in this specification, the invention may also have, but not be limited to, the following features contained within the description below.

It is important to note that throughout this Description, any references to data gathered from a sensor, sensor input, or data used to generate a delta can refer to an algorithm performed using data gathered from a sensor, or sensor synthesis. In some embodiments of the present invention, it is necessary to interpret, filter, or synthesize raw data to properly understand the meaning of the data. That is, one or more actions may be performed on sensor data before decisions regarding the data are made.

Figure 1:
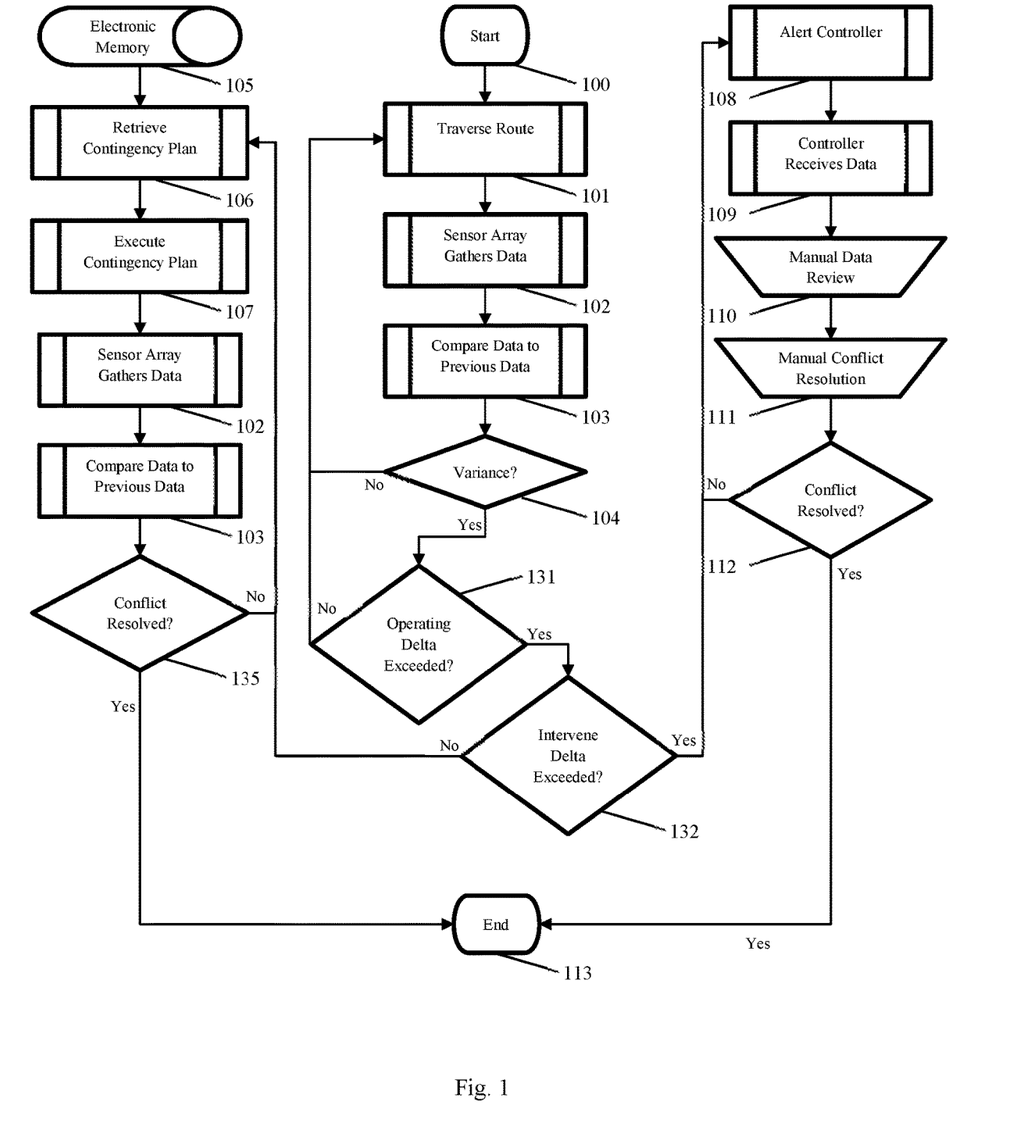
FIG. 1 is a flowchart showing the steps in a method for conflict resolution via contingency plan execution or human interaction as according to an embodiment of the present invention.

Referring now to FIG. 1, there is shown a flowchart showing the steps in a method for conflict resolution via contingency plan execution or human interaction as according to an embodiment of the present invention. The method is used by an autonomous vehicle, such as an autonomous delivery vehicle or a delivery robot, when the vehicle is delivering cargo to a destination. In one or more examples, the robot is narrow enough to fit on a small crowded sidewalk and can operate in most conditions as a human delivery person would. In one or more examples, the paths along which the robot operates include sidewalks, ramps, driveways, crosswalks, and curbs. The method starts (100) when the vehicle is traversing a route (101) which begins at an origin and terminates at a destination. The origin can be the vehicle's storage area, a distribution center, an office, a manufacturing facility, or the like. The destination is an address in an urban environment where the cargo must be delivered.

The route traversed (101) by the vehicle can be a route pre-programmed into the vehicle's memory. A plurality of sensors may have been previously used to map the route and generate one or more safe operating thresholds. The thresholds represent conditions along the route in which it is safe for the vehicle to operate.

During traversal of the route (101), one or more sensors contained within a sensor array mounted on the vehicle gather data (102) from the vehicle's environment. The gathered data, the results of an algorithm using the gathered data, or the results of sensor synthesis are compared to previously gathered data (103). The previously gathered data can be data that was recorded by similar sensor on a previous traversal of the route, or the safe operating thresholds as described above. The comparison between the present data and the previously recorded data is performed in order to detect a potentially unsafe operating condition in the vehicle's immediate environment.

If there is a variance detected (104) between the data of one or more of the vehicle's sensors when compared to the previously stored data, a check is made to see whether the variance exceeds a safe operating delta (131). The safe operating delta is a maximum value, the exceedance of which can indicate an unsafe operating environment. Conditions that may give rise to the operating delta being exceeded (131) can include, but are not limited to, a fallen tree across a sidewalk, interference by a pedestrian or animal, a road closure, flooding, snow, police action, or an attempted theft. If the operating delta is exceeded (131), a contingency plan is retrieved (106) from an electronic memory (105). The electronic memory (105) can be located in the vehicle, or can be at a remote site accessible by wireless communications. In the case of the former, the electronic memory (105) can be a computer memory component such as a RAM module containing the contingency plan. In the case of the latter, the electronic memory (105) can be a server that is accessed by cellular communications. In some embodiments of the present invention, the vehicle possesses a cellular transceiver.

After the contingency plan is retrieved, it is executed (107) to overcome or mitigate the conditions that gave rise to the exceedance of the operating delta (107). In some embodiments of the present invention, the contingency plan is executed (107) until the operating delta is no longer exceeded (131). That is, while executing the contingency plan (107), data is being gathered by the vehicle's sensors (102) and is compared to previously gathered data (103). The actions executed as part of the contingency plan include, but are not limited to, any combination of actions set forth in FIG. 2.

When any variance between the gathered data and the stored data no longer exceeds the operating delta, the conflict is considered resolved (135) and the method ends (113). The vehicle can continue to traverse its route (101).

If the comparison of the current data to the previous data (103) indicates that the conflict is not resolved (135) the operating delta is still exceeded (131) and the method continues. In some embodiments of the present invention, the same contingency plan may be executed (107) until the conflict is resolve and the method ends (113). In other embodiments of the present invention additional contingency plans may be retrieved (106) and executed (107) depending on the exact circumstances. In embodiments that retrieve and execute (106, 107) more than one contingency plan this may be due to additional operating deltas being exceeded (132) for different sensors during execution of the initial contingency plan (107).

The steps set forth when an operating delta are exceeded (131), but an intervention delta is not exceeded (132). An intervention delta (132) is a threshold, the exceedance of which requires the intervention of a human operator to resolve the conflict. In some embodiments of the present invention the intervention deltas are higher values for the same sensor data, or are unique data types that have no corresponding operating deltas. In the latter case, an intervention delta may be a voice recognition algorithm that operates on data received from a microphone. The intervention delta is immediately considered exceeded if the algorithm detects the phrase "help me".

If the intervention delta is exceeded (132) a controller is alerted (108). The controller is a human that is at a remote location. The remote location can be the origin from which the vehicle began traversing its route (101), or another location such as a control center. Data relating to the condition that caused the intervention delta to be exceeded (132) is transferred to the controller (109) so that he or she can review the situation (110). The transferred data can include the data from the sensor that exceeded its intervention threshold (132) as well as data from any or all of the other sensors in the sensor array.

After reviewing the data (110) the controller takes manual control of the vehicle and performs an action to resolve the conflict (111). The types of actions that a controller may take include, but are not limited to, any combination of actions set forth in FIG. 4. The controller can continue to receive data (109) from the vehicle and control the vehicle until the conflict is resolved (112). One indicator that the conflict is resolved is when the controller no longer observes conditions giving rise to the intervention delta being exceeded (132), or when received data no longer exceeds the intervention threshold. That is, a controller monitoring a live video feed from the vehicle may consider the conflict to be resolved (112) after they have manually driven (111) the vehicle around a tree in the road or when a laser rangefinder indicates they are a safe distance away from a double-parked vehicle. When the controller has resolved the conflict (112) the method ends (113).

It should be noted that the method illustrated in FIG. 1 can continue for so long as the vehicle is traversing its route (101).

Figure 2:
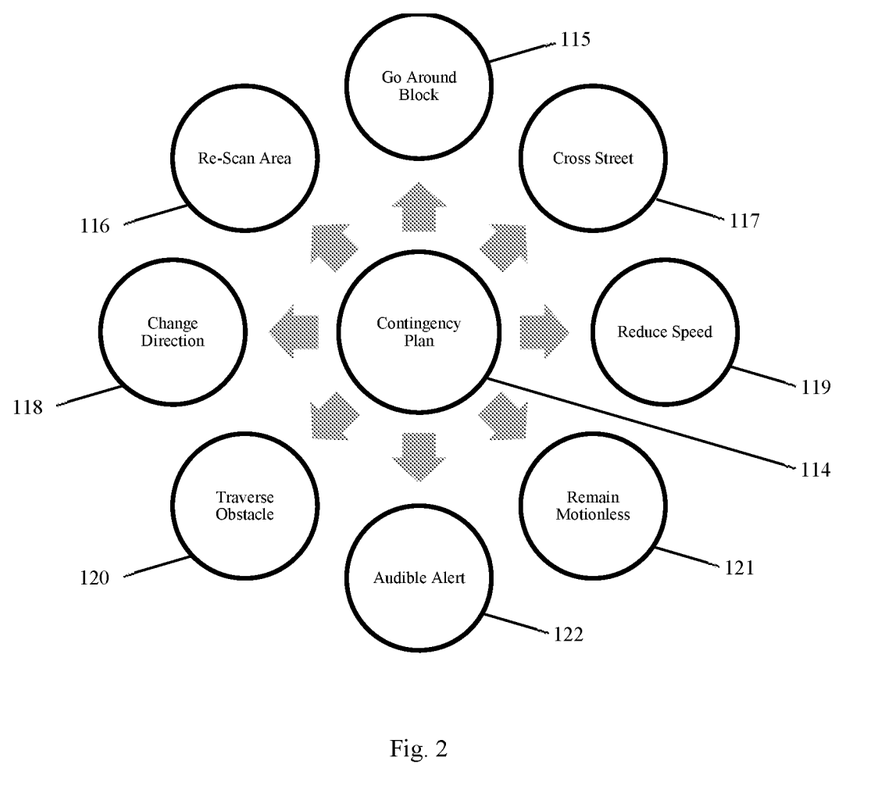
FIG. 2 is a radial diagram showing possible actions in a contingency plan as according to an embodiment of the present invention.

Referring now to FIG. 2 there is shown a radial diagram with the possible actions that can be taken as part of a contingency plan (114) as according to an embodiment of the present invention. The contingency plan (114) is a set of pre-determined instructions that an autonomous vehicle retrieves and executes when an operating delta is exceeded. The contingency plan can include, but is not limited to: going around the block (115), re-scanning the area (116), crossing a street (117), changing direction in order to avoid an obstacle (118), reducing speed (119), traversing over an obstacle (120), remaining motionless (121), or sounding an audible alert (122). It is also possible for the vehicle to execute a combination of the aforementioned depending on the nature of the problem faced by the vehicle.

In some embodiments of the present invention the contingency plan (114) is generated manually or by users with the aid of algorithms prior to the vehicle beginning to traverse a route. Different contingency plans (114) can be created for different routes to be traversed by the vehicle.

Figure 3:
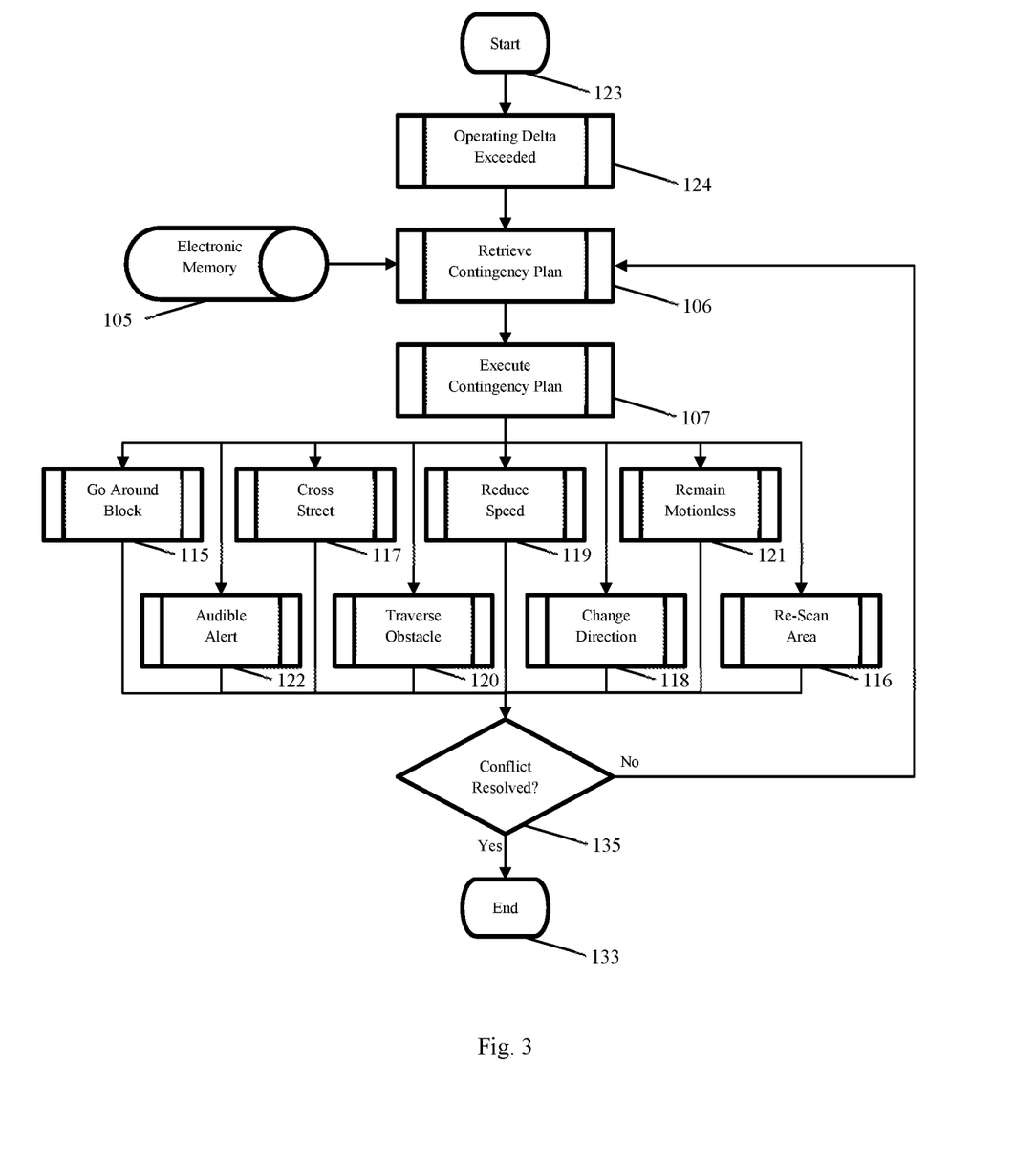
FIG. 3 is a flowchart showing the steps in a method when a contingency plan is executed as according to an embodiment of the present invention.

Referring now to FIG. 3, there is shown a flowchart setting forth the steps taken in a method when a contingency plan is executed as according to an embodiment of the present invention. The present invention can be used when an autonomous vehicle, such as an autonomous delivery vehicle, autonomously resolves a conflict between safe operating thresholds and conditions encountered when traversing a route. The vehicle may be in the process of travelling from an origin to a destination in order to deliver cargo to the destination.

Along the way, one or more of a plurality of sensors may detect anomalous conditions in the vehicle's immediate environment that exceed stored operating tolerances. The stored operating tolerances were previously generated and stored in an electronic memory (105), such as a database hosted on an electronic computing device, and are compared against data recorded from the vehicle's sensors. It is important to note that the stored operating tolerances can be compared against an algorithm or sensor synthesis that models data retrieved from the sensors. Such modelling is necessary when a sensor is unable to distinguish the exact nature of received data. In such cases a processing unit executes operations using the data to refine, filter, or analyze the received data.

The method illustrated in FIG. 3 starts (123) when an operating delta is exceeded (124). An operating delta is exceeded (124) when data from a sensor, an algorithm, or sensor synthesis exceeds a safe operating threshold. The safe operating threshold is also considered to be the stored operating tolerance as described above. The sensor's data, an algorithm operating on the data, or synthesis of the sensor data is compared to previously stored data which can be the safe operating threshold. If the comparison results in the exceedance of the operating delta (124), there may be an unsafe operating condition in the vehicle's environment that requires a different set of actions to occur.

When the operating delta is exceeded (124) a contingency plan is retrieved (106). The contingency plan is a series of one or more actions to be performed by the vehicle in response to the exceedance of the operating delta (124). The contingency plan can be executed (107) until the operating delta is no longer exceeded. That is, the contingency plan remains in effect until conditions fall back within normal operating thresholds.

When the contingency plan is executed (107) one or more of the following actions can be taken by the delivery vehicle: going around the block to avoid a problem or obstacle (115), crossing the street (117), reducing its speed (119), remaining motionless until normal operating conditions resume (121), sounding an audible alert to scare off animals or warn people (122), traversing an obstacle such as a small stick or gravel in the path of the vehicle (120), changing direction to avoid an obstacle (118), or re-scanning the area with the same or different sensors to confirm the existence of anomalous conditions (116).

If the conflict is resolved the method ends (133). If the conflict is not resolved (135), an operating delta is still exceeded (124), the same or another contingency plan may be retrieved (106) from the electronic memory (105). Although not pictured, in an embodiment of the present invention the same contingency plan is repeated until the conflict is resolved (135). In this embodiment, the method does not return to step (106).

Figure 4:
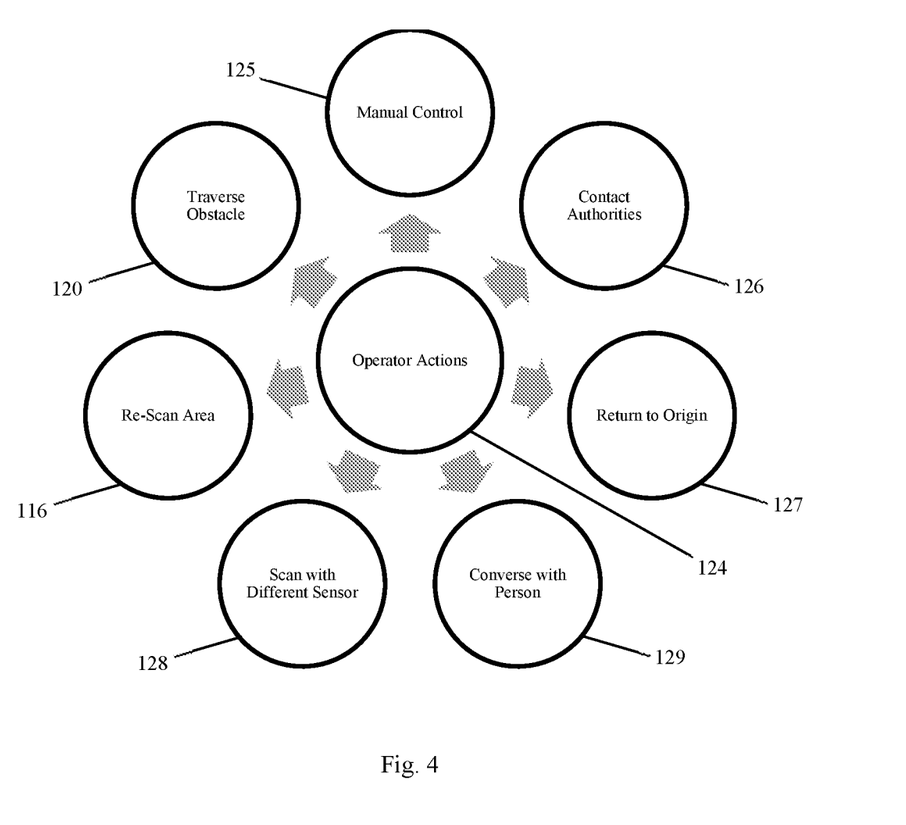
FIG. 4 is a radial diagram showing possible actions when a human operator intervenes as according to an embodiment of the present invention.

Referring now to FIG. 4 there is shown a radial diagram setting forth the possible actions that can be taken when a human operator intervenes as according to an embodiment of the present invention. The human operator is a controller that asserts manual control over an autonomous vehicle when an intervention delta is exceeded. The operator's actions (114) are a set of actions that the operator performs when the operating delta is exceeded. The operator's actions (114) can include, but is not limited to: taking manual control of the vehicle (125), manual control (125) allowing the operator to do such things as drive the vehicle, stop the vehicle, or open or close vehicle compartments; traversing obstacles (120) by driving the vehicle over or through the obstacle; contacting authorities (126), such as when an attempted theft is made or an emergent condition arises; re-scanning an area of interest using the same (116) or different sensors (128) located on the vehicle; instructing the vehicle to return to its origin (127); or accessing an on-board microphone and speaker to converse with a person (129) in the vehicle's immediate environment. It is also possible for the operator to execute a combination of the aforementioned depending on the nature of the problem faced by the vehicle.

In some embodiments of the present invention the operator's actions (124) can be predetermined and executed manually in response to a condition, or may be spontaneously decided upon by the operator after reviewing vehicle data.

Figure 5:
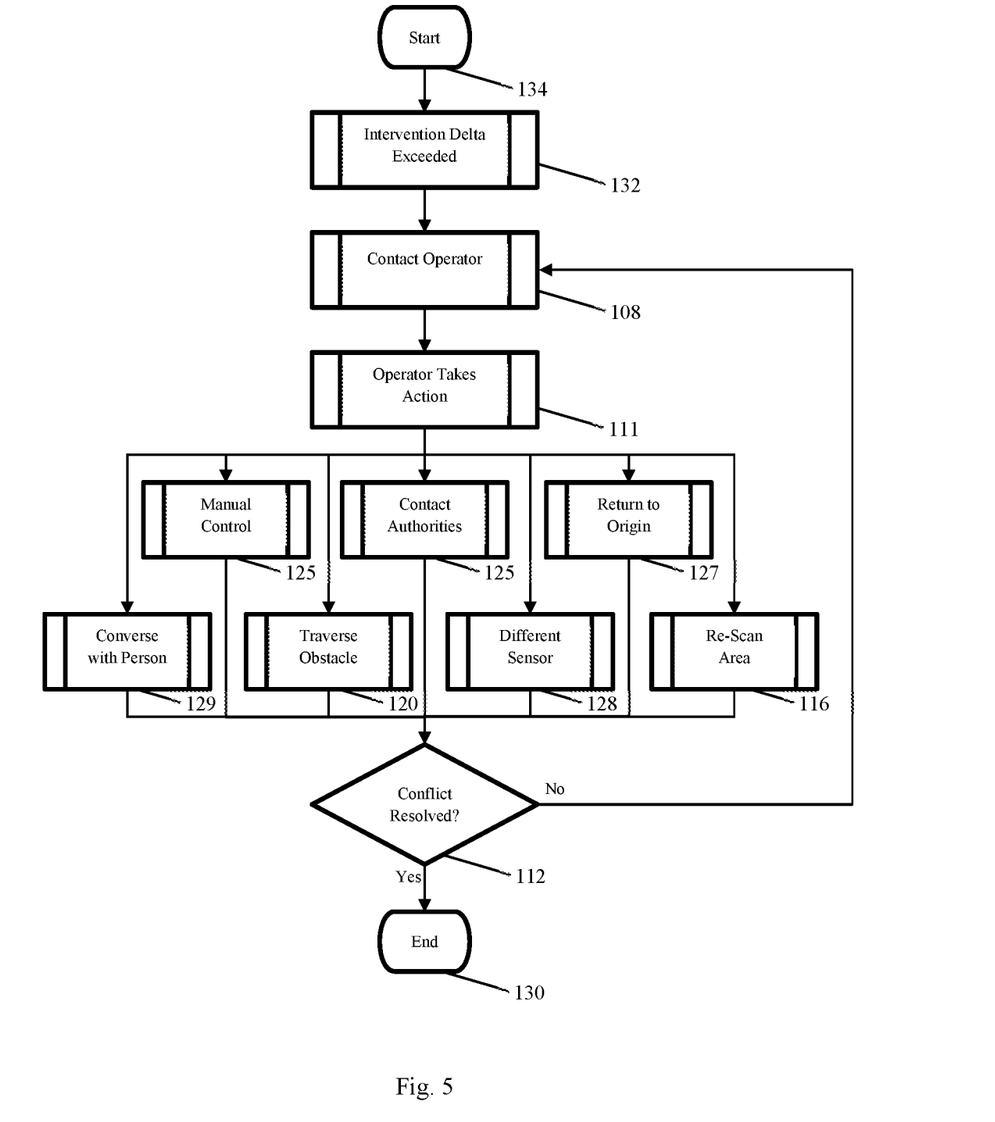
FIG. 5 is a flowchart showing the steps in a method when a human operator intervenes as according to an embodiment of the present invention.

Referring now to FIG. 5, there is shown a flowchart setting forth the steps taken by an operator when an intervention delta is exceeded as according to an embodiment of the present invention. The present invention can be used when an autonomous vehicle, such as an autonomous delivery vehicle, cannot or should not autonomously resolve a conflict arising between safe operating thresholds and conditions encountered when traversing a route of it. The conflict can arise because of previously unencountered obstacles or dangerous conditions along the route the vehicle is traversing.

Along the way, one or more of a plurality of sensors may detect anomalous conditions in the vehicle's immediate environment that exceed one or more stored intervention tolerances. The stored intervention tolerances were previously generated and stored in an electronic memory (105), such as a database hosted on an electronic computing device. The intervention tolerances are values that, when exceeded, indicate human interaction is necessary to resolve a problem or obstacle faced by an autonomous vehicle. The intervention tolerances are compared against data recorded from the vehicle's sensors. It is important to note that the stored intervention tolerances can be compared against an algorithm or sensor synthesis that models data retrieved from the sensors. Such modelling is necessary when a sensor is unable to distinguish the exact nature of received data. In such cases a processing unit executes operations using the data to refine, filter, or analyze the received data.

The method illustrated in FIG. 5 starts (134) when an intervention delta is exceeded (124). An intervention delta is exceeded (132) when data from a sensor, an algorithm, or sensor synthesis exceeds a safe operating threshold and requires human attention. The safe operating threshold is also considered to be the stored intervention tolerance as described above. The sensor's data, an algorithm operating on the data, or synthesis of the sensor data is compared to previously stored data which can be the safe operating threshold. If the comparison results in the exceedance of the intervention delta (132), there may be an unsafe operating condition in the vehicle's environment that requires a different set of actions to occur.

When the intervention delta is exceeded (132) the operator is contacted (108) and data from the vehicle is sent to the operator. The operator takes action (111) in an effort to resolve the conflict by overcoming the obstacle or problem that caused the intervention delta to be exceeded (132). The operator can perform one or more actions (111) in response to the exceedance of the intervention delta (132). The operator can continue to take action (111) until the operating delta is no longer exceeded. That is, the operator takes actions (111) until conditions fall back within normal operating thresholds.

When the operator takes action (111) one or more of the following can be performed: asserting manual control over the vehicle (125), contacting authorities (125), causing the vehicle to autonomously or manually return to its origin (127), remotely conversing with a person through on-board hardware (129), driving the vehicle over or through minor obstacles (120), or re-scanning the area with the same (116) or different sensors (128) to confirm the existence of anomalous conditions.

If the conflict is resolved (112) the method ends (130). If the conflict is not resolved (112), an intervention delta is still exceeded (132), the same or another action or combination of actions may be performed by the operator (111).

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for re-mapping a safe and traversable route during delivery operations. Further, since numerous modifications and changes will readily occur to those skilled in the art, it is not desired to limit the method for re-mapping a safe and traversable route during delivery operations to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A method for responding to anomalous conditions encountered by a robot delivery vehicle, the method comprising:

following a pre-programmed route by the robot delivery vehicle to traverse a route, wherein the pre-programmed route includes one or more old sensor data sets that were gathered to map the route, wherein each old sensor data set is unique in a sensor type and includes a set of one or more safe operating conditions that are represented by a respective set of one or more safe operating deltas and a corresponding set of one or more intervention deltas, wherein each safe operating delta has a magnitude and each intervention delta has a magnitude, wherein the magnitude of each intervention delta is greater than the magnitude of the corresponding safe operating delta, and wherein the sensor type is selected from a group consisting of a GPS sensor, a video sensor, and a laser sensor;

traversing the route by the robot delivery vehicle while collecting one or more new sensor data sets using one or more sensors of a sensor array that is included in the robot delivery vehicle, wherein each new sensor data set includes data from an individual sensor of the sensor array and comprises information respective to a set of one or more detected conditions, and wherein at least one sensor of the array is of the same sensor type as one of the old sensor data sets;

comparing by the robot delivery vehicle the new sensor data sets and the old sensor data sets of the same sensor type to determine a variance between the set of one or more detected conditions and the set of one or more safe operating conditions;

calculating by the robot delivery vehicle whether the variance exceeds any safe operating delta of the set of one or more operating deltas;

calculating by the robot delivery vehicle whether the variance exceeds the corresponding intervention delta of the set of one or more intervention deltas when the robot delivery vehicle determines that the variance exceeds a safe operating delta of the set of one or more operating deltas;

executing by the robot delivery vehicle a contingency plan when the robot delivery vehicle determines that the variance exceeds the safe operating delta and does not exceed the corresponding intervention delta, wherein the contingency plan includes one or more instructions for the robot delivery vehicle to execute to resolve the variance exceeding the safe operating delta; and causing the robot delivery vehicle to alert a human controller at a remote location when the robot delivery vehicle determines that the variance exceeds the safe operating delta and the corresponding intervention delta, and receiving commands by the robot delivery vehicle from the human controller for the robot delivery vehicle to execute to resolve the variance exceeding the safe operating delta and the corresponding intervention delta.

2. The method of claim 1, wherein the variance is determined to exceed the safe operating delta when the set of one or more detected conditions includes an anomalous condition that is not included in the set of one or more safe operating conditions.

3. The method of claim 2, wherein the anomalous condition includes one or more of a minor obstacle, a fallen tree, interference by a pedestrian, interference by an animal, a road closure, flooding, snow, ice, police action, and an attempted theft.

4. The method of claim 3, wherein the one or more instructions included in the contingency plan include sounding an audible alert to scare off the animal or warn the pedestrian.

5. The method of claim 3, further comprising providing access by the robot delivery vehicle to the human controller of an on-board microphone that is included in the robot delivery vehicle, and transmitting by the robot delivery vehicle dialogue from the human controller through the on-board microphone to allow the human controller to converse with the pedestrian.

6. The method of claim 2, wherein the one or more instructions included in the contingency plan include re-scanning the anomalous condition using the one or more sensors included in the robot delivery vehicle to confirm the existence of the anomalous condition.

7. The method of claim 1, further comprising repeating comparing by the robot delivery vehicle the new sensor data sets and the old sensor data sets of the same sensor type to determine a new variance between the set of one or more detected conditions and the set of one or more safe operating conditions when the robot delivery vehicle has executed the one or more instructions included in the contingency plan; and executing a new contingency plan by the robot delivery vehicle when the robot delivery vehicle determines that the new variance exceeds the safe operating delta, wherein the new contingency plan includes one or more new instructions for the robot delivery vehicle to execute to resolve the safe operating delta being exceeded that are different from the one or more instructions included in the contingency plan.

8. The method of claim 1, wherein the remote location is a control center.

9. The method of claim 1, wherein the one or more instructions included in the contingency plan include one or more of remaining motionless until normal operating conditions resume, crossing a street, and traversing a small obstacle that is in a path of the robot delivery vehicle.

10. The method of claim 1, further comprising repeating comparing by the robot delivery vehicle the new sensor data sets and the old sensor data sets of the same sensor type to determine a new variance between the set of one or more detected conditions and the set of one or more safe operating conditions after the robot delivery vehicle executes the contingency plan a first time; and repeating executing the contingency plan by the robot delivery vehicle when the robot delivery vehicle determines the new variance exceeds the safe operating delta after the contingency plan is executed the first time.

11. The method of claim 1, wherein the variance is determined to exceed the intervention delta when a detected condition of the set of one or more detected conditions is an anomalous condition that is not included in the set of one or more safe operating conditions, and wherein the anomalous condition cannot be traversed by the robot delivery vehicle without manual intervention.

12. The method of claim 11, further comprising receiving instructions by the robot delivery vehicle from the human controller to re-scan the anomalous condition using the one or more sensors included in the robot delivery vehicle to confirm the existence of the anomalous condition when the robot delivery vehicle contacts the human controller.

13. The method of claim 1, wherein the robot delivery vehicle is a self-propelled vehicle that is configured to travel over one or more of sidewalks and crowded sidewalks.

14. A method for responding to an anomalous condition encountered by a robot delivery vehicle, the method comprising:

causing the robot delivery vehicle to traverse a route by following a pre-programmed route that is stored on a memory included in the robot delivery vehicle, wherein the pre-programmed route includes a set of expected conditions that are contained within the route, wherein an operating delta and an intervention delta are associated with the set of expected conditions, wherein the operating delta and the intervention delta each have a magnitude, and wherein the magnitude of the intervention delta is greater than the magnitude of the operating delta;

collecting by the robot delivery vehicle one or more sensor data sets using one or more sensors that are included in the robot delivery vehicle to gather information on a detected set of one or more conditions contained within the route, wherein each sensor has a sensor type, and wherein the sensor type is selected from a group consisting of a GPS sensor, a video sensor, and a laser sensor;

encountering an anomalous condition by the robot delivery vehicle while the robot delivery vehicle traverses the route;

gathering information on the anomalous condition by the robot delivery vehicle using the one or more sensors;

and including the information on the anomalous condition in the detected set of one or more conditions;

comparing by the robot delivery vehicle the detected set of one or more conditions and the set of expected conditions, and determining by the robot delivery vehicle a variance between the detected set of one or more conditions and the set of expected conditions, wherein the variance is caused by the anomalous condition;

calculating by the robot delivery vehicle whether the variance exceeds the operating delta; and calculating by the robot delivery vehicle whether the variance exceeds the intervention delta when the robot delivery vehicle determines the variance exceeds the operating delta;

executing a contingency plan when the robot delivery vehicle calculates that the variance exceeds the operating delta and does not exceed the intervention delta, wherein the contingency plan includes one or more instructions for the robot delivery vehicle to execute to traverse the anomalous condition; and contacting by the robot delivery vehicle a human controller at a remote location when the robot delivery vehicle calculates that the variance exceeds the operating delta and the intervention delta, and sending by the robot delivery vehicle the one or more sensor data sets that include information respective to the one or more detected conditions to the human controller.

15. The method of claim 14, further comprising reviewing by the human controller the one or more detected conditions when the robot delivery vehicle contacts the human controller, and controlling the robot delivery vehicle remotely by the human controller to resolve the anomalous condition based on the detected set of one or more conditions.

16. The method of claim 14, wherein the anomalous condition includes one or more of a minor obstacle, a fallen tree, interference by a pedestrian, interference by an animal, a road closure, flooding, snow, ice, police action, and an attempted theft.

17. The method of claim 16, further comprising contacting authorities by the human controller when the anomalous condition is an attempted theft.

18. The method of claim 16, further comprising receiving commands by the robot delivery vehicle from the human controller to traverse the minor obstacle.

19. The method of claim 14, wherein the robot delivery vehicle is a self-propelled vehicle that is configured to travel over one or more of sidewalks and crowded sidewalks.

20. The method of claim 14, wherein the remote location is a control center.

* * * * *